(12) United States Patent
Brown (10) Patent No.: US 10,298,730 B2
(45) Date of Patent: May 21, 2019

(54) MULTI-FUNCTION HANDLE FOR ELECTRONIC DEVICE

(71) Applicant: Jared William Brown, Boulder, CO (US)

(72) Inventor: Jared William Brown, Boulder, CO (US)

(*) Notice: Subject to any disclaimer, the term of this patent is extended or adjusted under 35 U.S.C. 154(b) by 0 days.

(21) Appl. No.: 15/973,789

(22) Filed: May 8, 2018

(65) Prior Publication Data

US 2018/0332153 A1 Nov. 15, 2018

Related U.S. Application Data

(60) Provisional application No. 62/503,579, filed on May 9, 2017.

(51) Int. Cl.
| | |
|---|---|
| *H04M 1/00* | (2006.01) |
| *H04M 1/04* | (2006.01) |
| *H04B 1/3888* | (2015.01) |
| *H04B 1/3877* | (2015.01) |
| *H04M 1/02* | (2006.01) |

(52) U.S. Cl.
CPC ............ *H04M 1/04* (2013.01); *H04B 1/3888* (2013.01); *H04B 1/3877* (2013.01); *H04M 1/0279* (2013.01)

(58) Field of Classification Search
CPC ............. H04W 88/02; H04M 1/72519; H04M 1/0247; H04M 1/0214; H04M 1/23; H04M 1/0238
USPC ............ 455/575.8, 575.6, 575.1, 550.1, 90.3
See application file for complete search history.

(56) References Cited

U.S. PATENT DOCUMENTS

| | | | | |
|---|---|---|---|---|
| 8,746,448 | B1* | 6/2014 | Bellace | A45F 5/00 206/320 |
| 2005/0009582 | A1* | 1/2005 | Vooi-Kia | H04M 1/0237 455/575.4 |
| 2012/0113572 | A1* | 5/2012 | Gaddis, II | G06F 1/1628 361/679.01 |
| 2013/0146625 | A1* | 6/2013 | Karle | A45F 5/00 224/217 |
| 2015/0318885 | A1* | 11/2015 | Earle | H04B 1/385 455/575.6 |
| 2016/0234364 | A1* | 8/2016 | Qian | H04M 1/0279 |
| 2016/0344437 | A1* | 11/2016 | Gordon | H04B 1/3888 |
| 2018/0220782 | A1* | 8/2018 | Mody | A45F 5/00 |

* cited by examiner

*Primary Examiner* — Temica M Beamer
(74) *Attorney, Agent, or Firm* — The Neudeck Law Firm (57) ABSTRACT

Disclosed is a handle for an electronic device that consists of a ring mounted on a hinge that slides over a user's finger to aid in holding the electronic device. The hinge allows the handle to either be stored in a recessed area of the exterior face of the electronic device when not in use, or rotated perpendicular to the exterior face of the electronic device when in use. The handle also features standardized contact patches that mate with clips that can be used to mount the electronic device on a vehicle dashboard or similar. The handle can be integrated into the electronic device itself, or into a separate, protective case placed around the electronic device.

18 Claims, 7 Drawing Sheets

MULTI-FUNCTION HANDLE FOR ELECTRONIC DEVICE

BACKGROUND

Electronic devices such as mobile phones and tablets are common hand-held consumer devices. The common rectangular, smooth design can make these devices difficult to hold, and may not be ergonomic to hold. Additionally, a user may want to easily mount such a device to a vehicle dashboard, a desk, or another stationary object. The tendencies of a user to repeatedly use, put away, and move an electronic device such as a mobile phone generates a need for the ability to easily hold the device, as well as to provide easy storage of the device.

SUMMARY

An embodiment of the present invention may therefore comprise a handle for an electronic device comprising: a ring to slide over a finger of a user of the electronic device; a hinge that attaches the ring to an exterior face of the electronic device, so that the ring can pivot on the hinge to a substantially perpendicular position to the exterior face to aid the user in holding the electronic device; a recess in the exterior face of the electronic device such that the ring can fold into the recess and be positioned flush with the exterior face in a stored position when the handle is not in use.

An embodiment of the present invention may therefore further comprise a method of providing a handle for an electronic device comprising: providing a ring to slide over a finger of a user of the electronic device; attaching a hinge to the ring and to an exterior face of the electronic device, so that the ring can pivot on the hinge to a substantially perpendicular position to the exterior face to aid said user in holding the electronic device; a recess in the exterior face of the electronic device such that the ring can fold into the recess and be positioned flush with the exterior face in a stored position when the handle is not in use.

DETAILED DESCRIPTION OF THE EMBODIMENTS

Figure 1A:
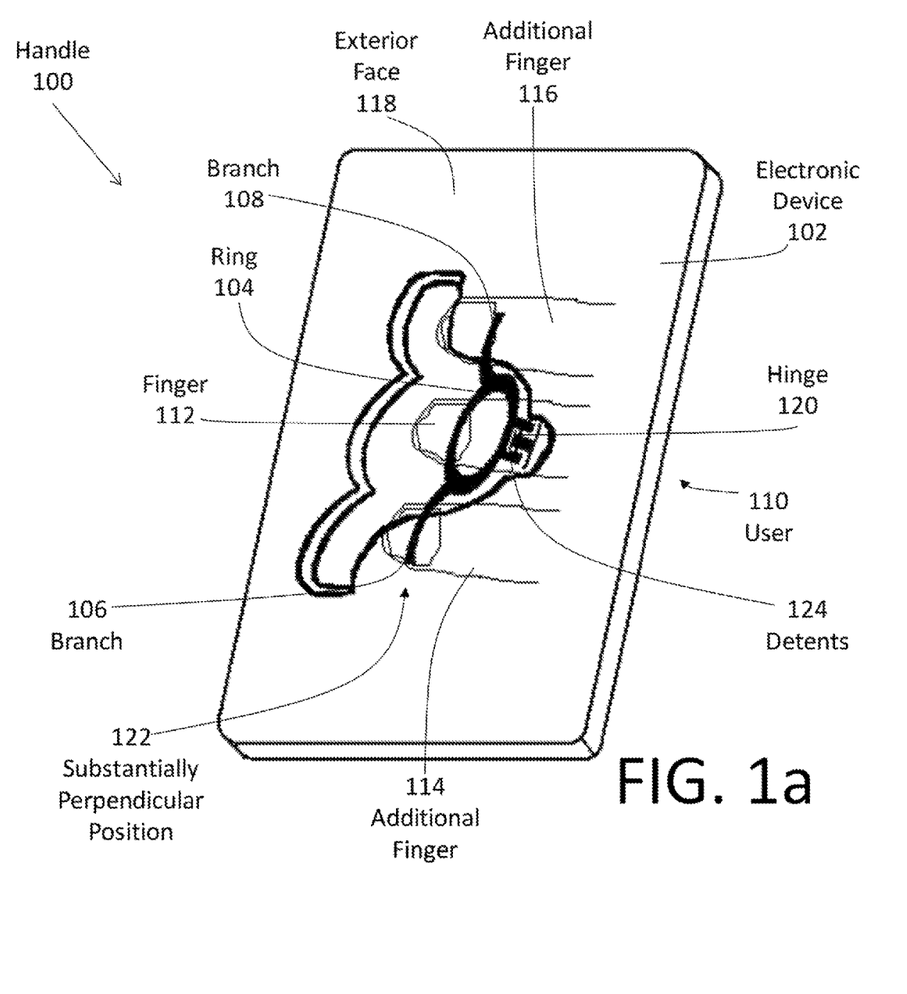
FIG. 1a is a schematic of a handle for an electronic device.

FIG. 1a is a schematic view of a handle 100 for an electronic device 102. Handle 100 consists of a ring 104 with two branches 106, 108 on either side of ring 104. User 110 may slide a finger 112 into ring 104 in order to more easily hold electronic device 102. Additional fingers 114, 116 can contact branches 106, 108 to further stabilize electronic device 102 to allow further ease for user 110 to hold onto electronic device 102. Ring 104 is attached to an exterior face 118 of electronic device 102 through a hinge 120, which allows handle 100 to pivot into different positions depending on use. As shown, handle is in a substantially perpendicular position 122 to exterior face 118 of electronic device when in use to hold electronic device 102. Detents 124 can be located on hinge 120, so that hinge 120 locks into substantially perpendicular position 122. In this way, handle 100 aids user 110 in holding onto electronic device 102 with fingers 112, 114, 116, decreasing the possibility of user 110 dropping electronic device 102, and also helping with ergonomics of user 110 when using electronic device 102. As shown, handle 100 is integrated into electronic device 102 itself, as exterior face 118 is an integral part of electronic device 102. Electronic device 102 may be a mobile phone, a tablet, or any other hand-held device. Handle 100 may be made from a variety of materials, including but not limited to plastic, metal, or wood.

Figure 1B:
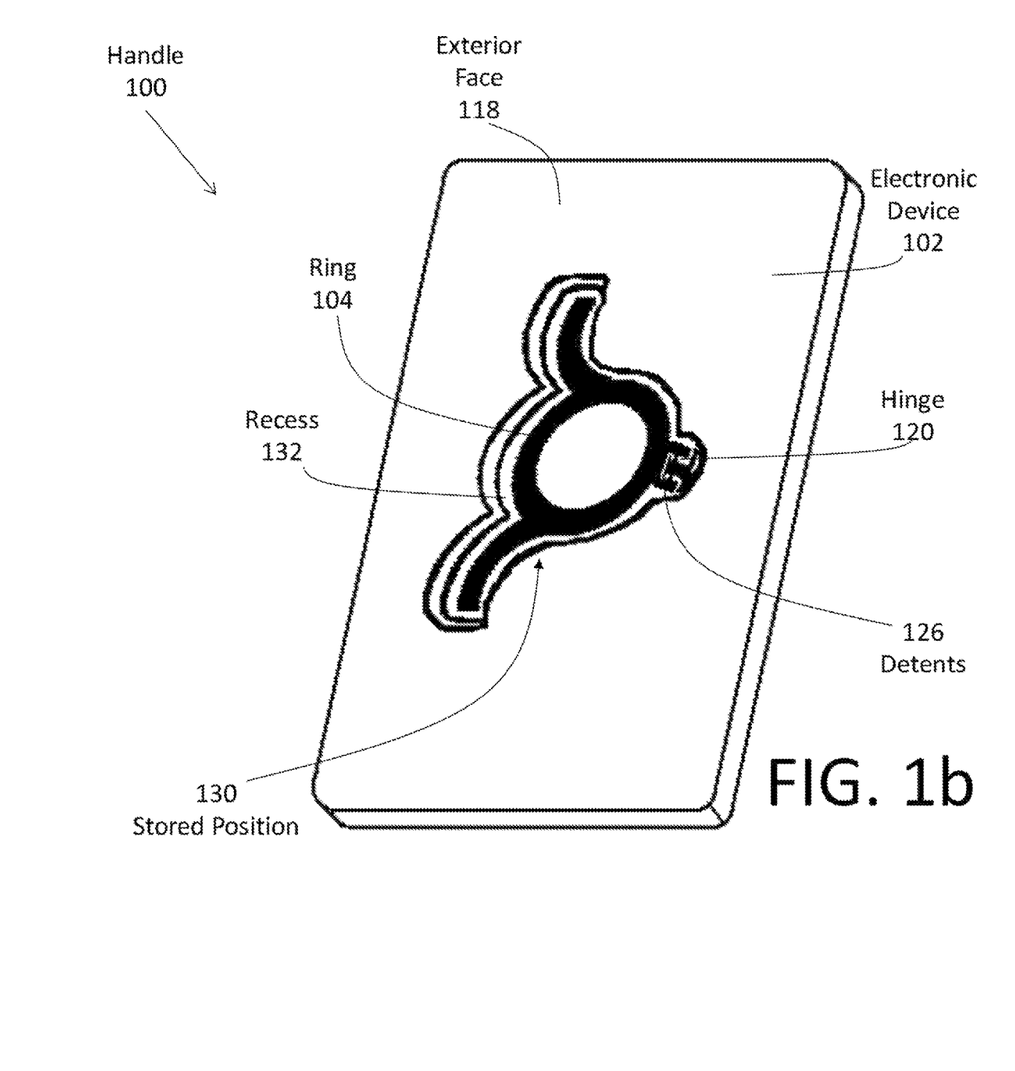
FIG. 1b is a schematic of a handle for an electronic device in a stored position.

FIG. 1b is a schematic of a handle 100 for an electronic device 102 in a stored position 130. When handle 100 is not in use, it rotates on hinge 120 to fold into a stored position 130, where ring 104 is located in a recess 132 of exterior face 118 of electronic device 102. In this way, handle 100 is located flush with the exterior face 118 of electronic device 102 when not in use, providing a smooth overall exterior to electronic device 102 for easy storage in a pocket or other location. Detents 126 may be located on hinge 120 to hold handle 100 in stored position 130.

Figure 2:
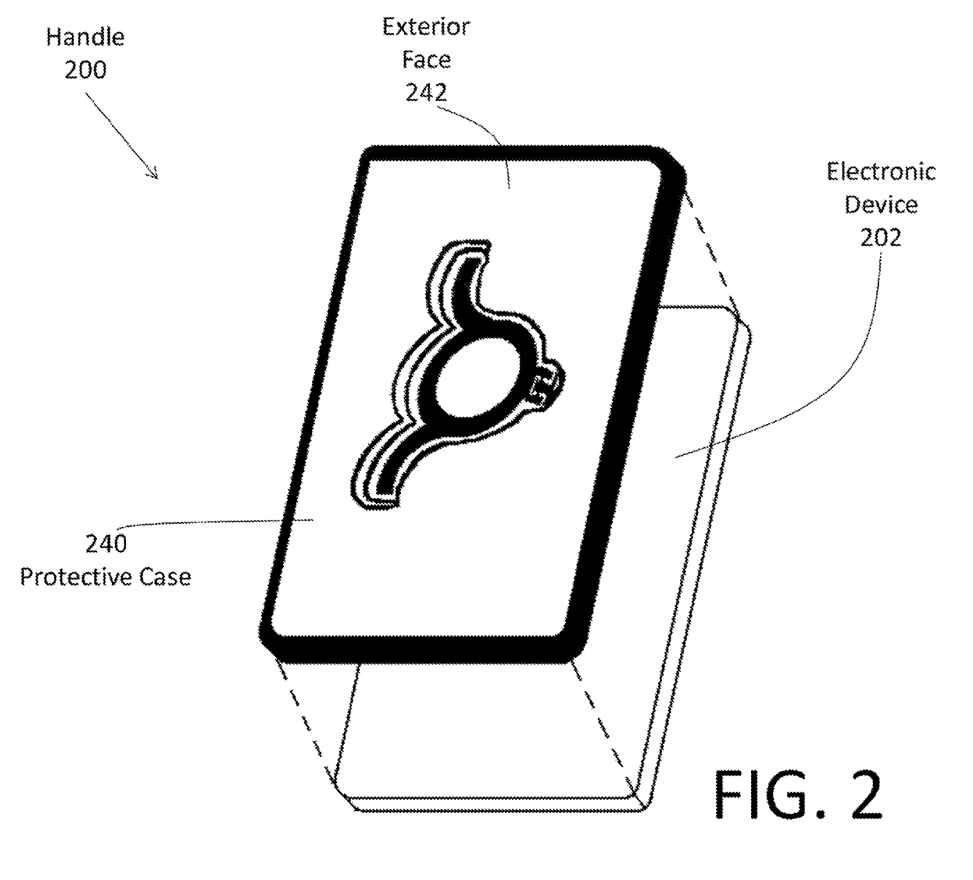
FIG. 2 is an exploded view of a handle for an electronic device integrated into a protective case for an electronic device.

FIG. 2 is an exploded view of a handle 200 for an electronic device 202 integrated into a protective case 240 for electronic device 202. Handle 200 functions the same as described in FIG. 1, but instead of being integrated into the electronic device 202 itself, it is integrated into an exterior face 242 of a protective case 240 that is placed around electronic device 202. This way, handle 200 can be provided for any existing device, by integrating it into protective case 240 that is a separate part to electronic device 202.

Figure 3:
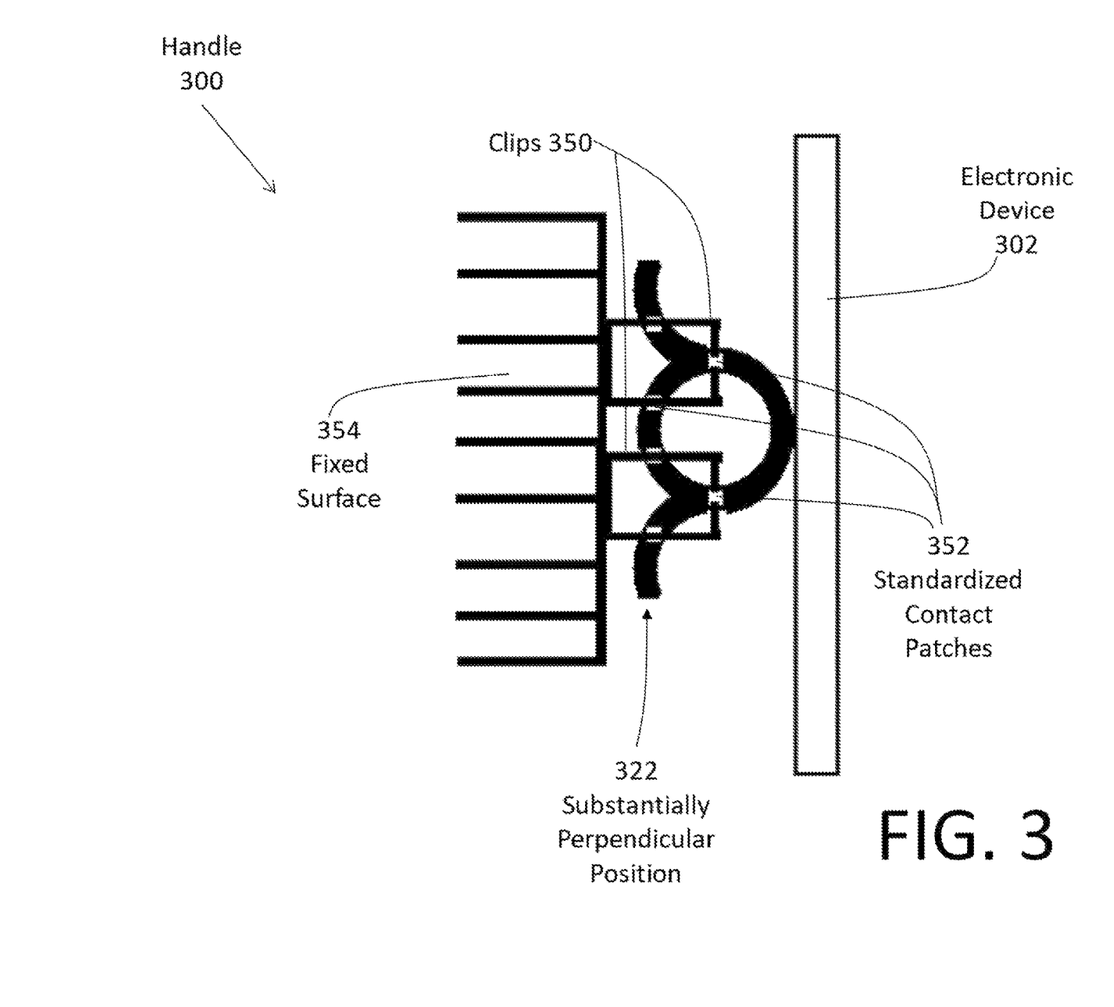
FIG. 3 is a schematic of a handle for an electronic device mounted in clips.

FIG. 3 is a schematic of a handle 300 for an electronic device 302 mounted in clips 350. Handle 300 is in a substantially perpendicular position 322, and has standardized contact patches 352 that mate with clips 350. Standardized contact patches 352 may consist of grooves, holes, or other shapes that are arranged in a set pattern to mate with clips 350, so that clips 350 hold onto handle 300 securely. This way, clips 350 may be integrated into a fixed surface 354, such as a vehicle dashboard, computer monitor, or a stand, and electronic device 302 can mount securely to fixed surface 354 without additional devices. In this way, handle 300 has multiple functions, as it can be held directly by a user 110 as described in FIG. 1a, or mounted to a fixed surface 354 without additional hardware.

Figure 4A:
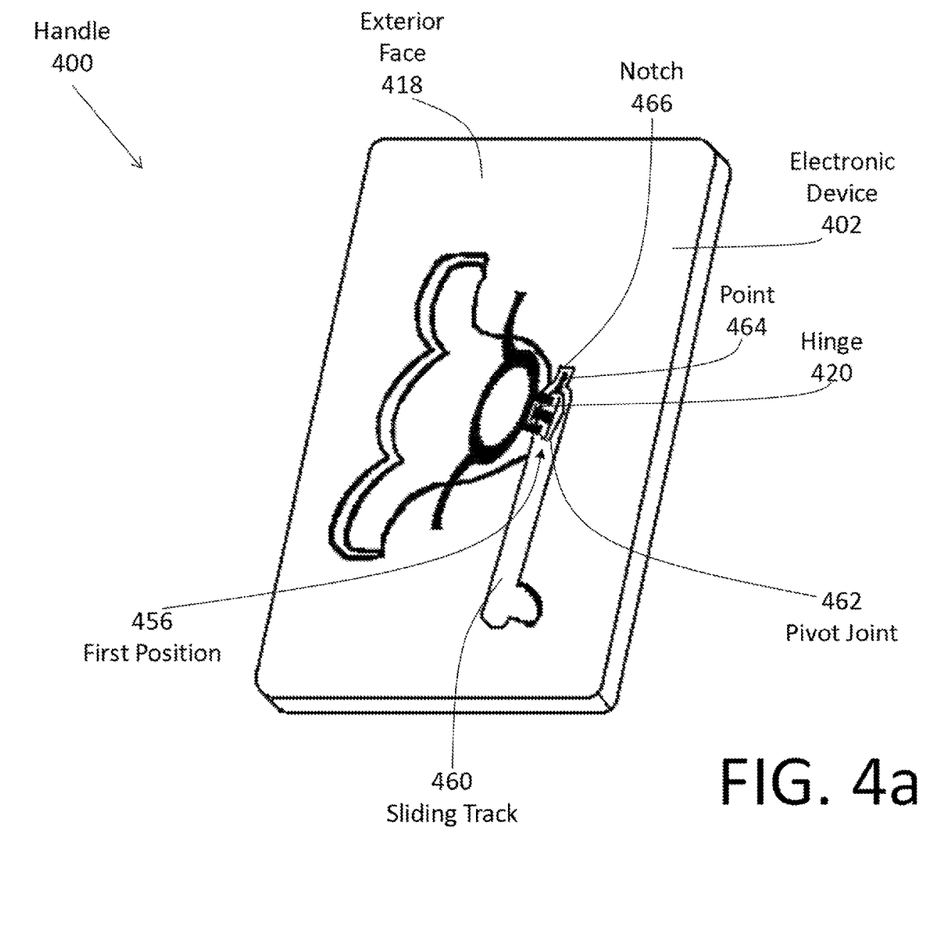
FIG. 4a is a schematic of a handle for an electronic device in a first position on a sliding track for the electronic device to be used in portrait mode.

FIG. 4a is a schematic of a handle 400 for an electronic device 402 in a first position 456 on a sliding track 460 for the electronic device 402 to be used in portrait mode. Many electronic devices are used in both portrait and landscape modes, and the optimal position of handle 400 may be different for each mode to maximize ease of use. To provide this flexibility, hinge 420 is mounted on a pivot joint 462 that is located in a sliding track 460 in exterior face 418 of electronic device 402. Pivot joint 462 may be as simple as a circular groove that captures sliding track 460, and allows rotation of hinge 420 with respect to exterior face 418 of electronic device 402. Additionally, point 464 may be used on pivot joint 462, which locks into a similarly shaped notch 466 in exterior face 418 to prevent rotation of pivot joint 462 when this rotation is not desirable. As shown, point 464 fits into notch 466 to keep handle 400 positioned in portrait mode while in first position 456 that is optimized for ergonomics of holding electronic device 402 in portrait mode.

Figure 4B:
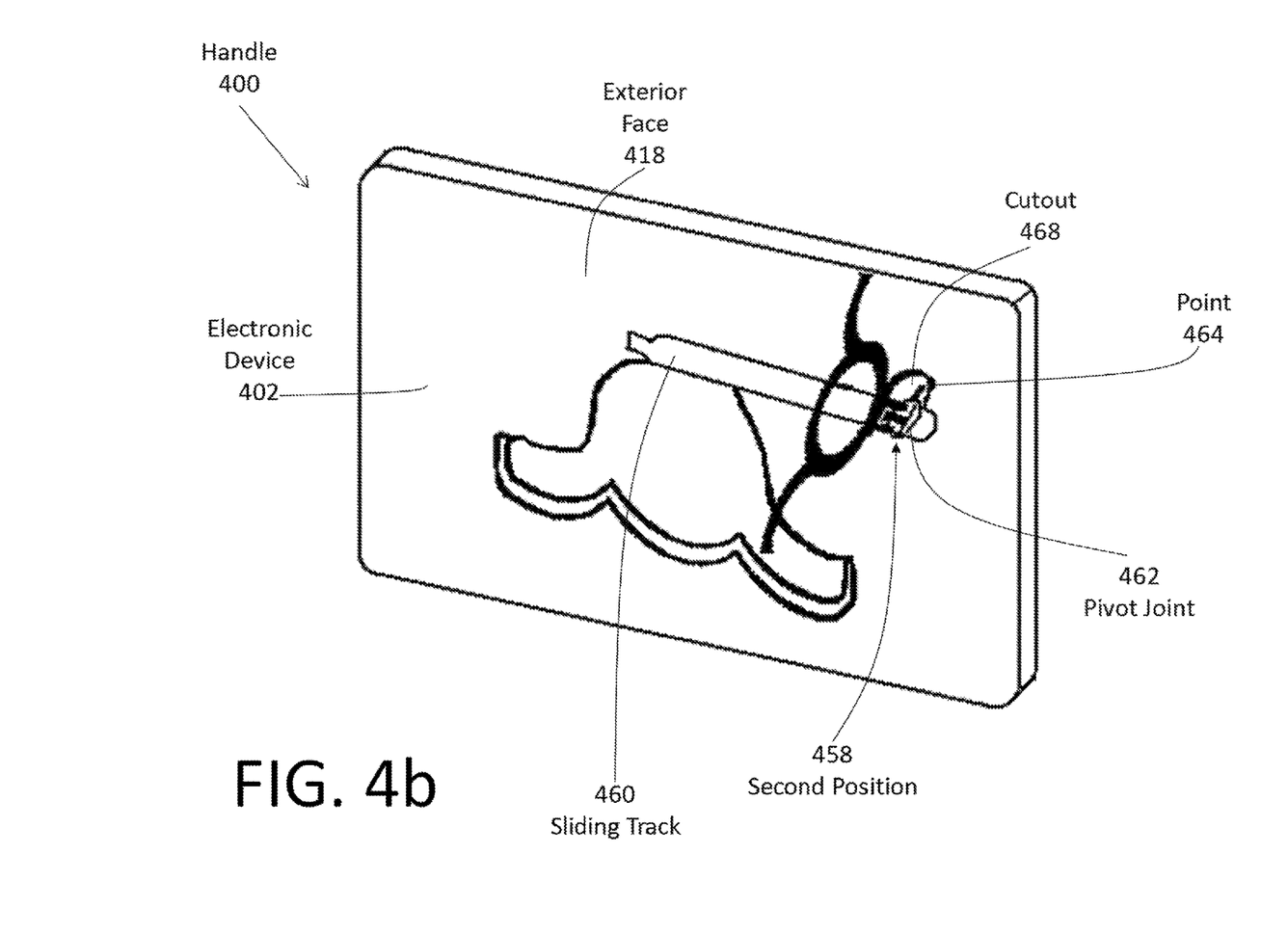
FIG. 4b is a schematic of a handle for an electronic device in a second position on a sliding track for the electronic device to be used in landscape mode.

FIG. 4b is a schematic of a handle 400 for an electronic device 402 in a second position 458 on a sliding track 460 for the electronic device 402 to be used in landscape mode. For landscape mode, handle 400 has been moved to second position 458 on sliding track 460, and rotated ninety degrees, so that ergonomics of holding electronic device 402 is optimized when use in landscape mode is desired. Pivot joint 462 is moved along sliding track 460 to second position 458, where point 464 is no longer held in place, and allows pivot joint 462 to rotate handle 400 ninety degrees. Cutout 468 may be used in exterior face 418 of electronic device 402 to contact point 464 when pivot joint 462 has made the ninety degree rotation, holding handle 400 in place in landscape mode. This way, handle 400 can be positioned at different points on exterior face 418 of electronic device 402 that are optimized for the user to hold electronic device 402 in portrait or landscape mode.

Figure 5:
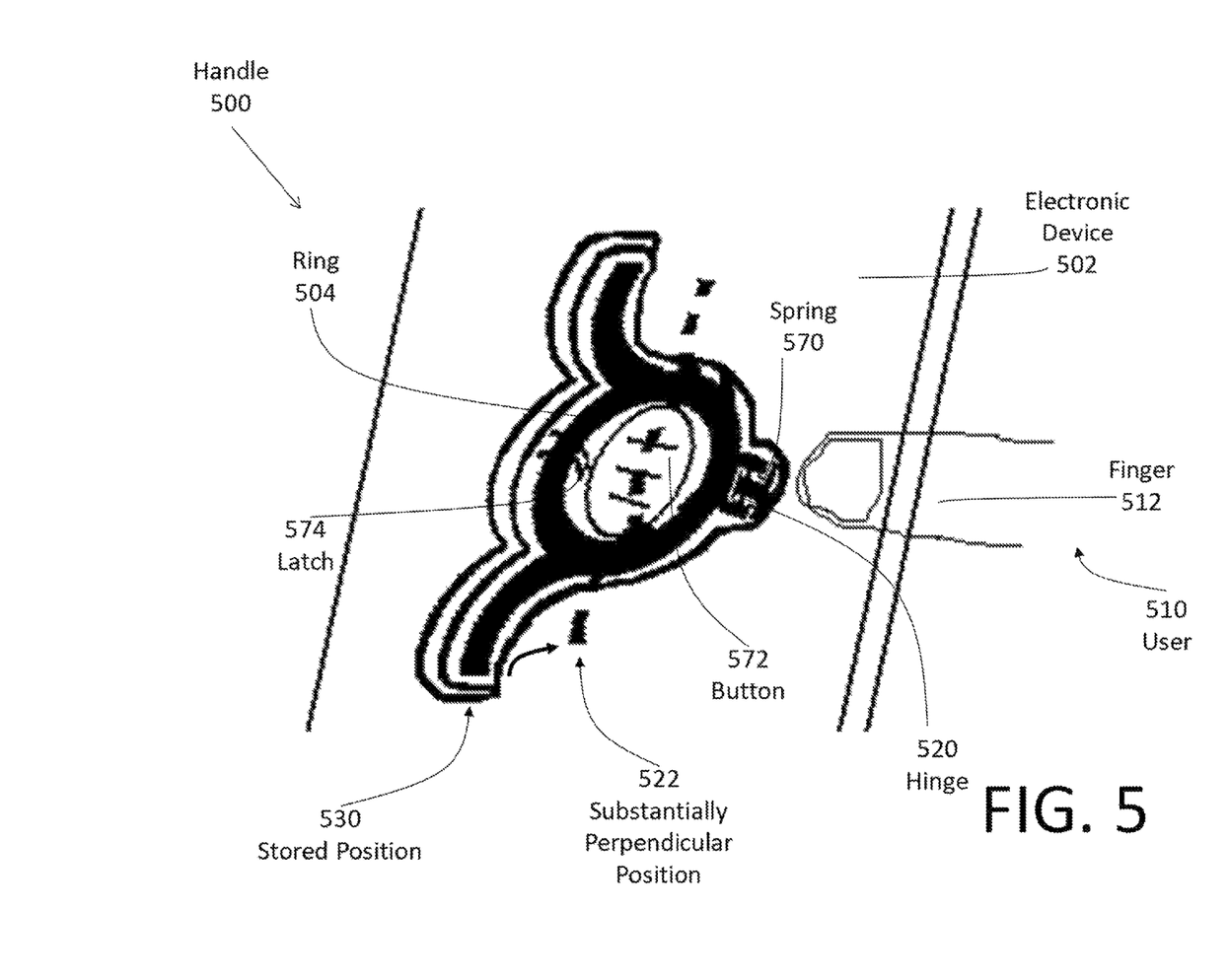
FIG. 5 is a schematic of a handle for an electronic device with a spring in a hinge to deploy around a finger of a user when a button is pushed.

FIG. 5 is a schematic of a handle 500 for an electronic device 502 with a spring 570 in a hinge 520 to deploy ring 504 around a finger 512 of a user 510 when a button 572 is pushed. Handle 500 is held in place in a stored position 530 by latch 574 when not in use. When button 572 is pushed, latch 574 releases handle 500 and spring 570 pushes on handle 500 to rotate it to a substantially perpendicular position 522. Button 572 is located internal to ring 504 when handle is in stored position 530, so that finger 512 of user 510 is positioned to slide into ring 504 when finger 512 pushes button 572 and spring 570 rotates handle 500. This positioning of button 572 increases the ease of use of handle 500, as ring 504 of handle 500 automatically slides over finger 512 when handle 500 is deployed. When no longer needed, handle 500 is pushed against spring 570 back to stored position 530, and is held in place by latch 574.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A handle for an electronic device comprising:
a ring to slide over a finger of a user of said electronic device;
a hinge that attaches said ring to an exterior face of said electronic device, so that said ring can pivot on said hinge to a substantially perpendicular position to said exterior face to aid said user in holding said electronic device;
a recess in said exterior face of said electronic device such that said ring can fold into said recess and be positioned flush with said exterior face in a stored position when said handle is not in use; and,
a spring in said hinge that rotates said handle into said substantially perpendicular position when a button is pushed to release said handle from said stored position, where said button is located inside said ring when said handle is in said stored position so that said ring automatically slides over said finger of said user when said finger pushes said button.

2. The handle of claim 1 where said exterior face of said electronic device is an integral part of said electronic device.

3. The handle of claim 1 where said exterior face of said electronic device is a protective case placed around said electronic device.

4. The handle of claim 1 further comprising:
two branches connected to opposite ends of said ring such that additional fingers of said user utilize said branches to further stabilize said electronic device when using said handle.

5. The handle of claim 1 further comprising:
a pivot joint between said hinge and said exterior face of said electronic device so that said handle can pivot ninety degrees to enable said user to hold said electronic device with said handle in portrait or landscape mode.

6. The handle of claim 5 further comprising:
a sliding track between said hinge and said exterior face of said electronic device so that said handle can be located at different positions on said exterior face of said electronic device that are optimized for said user to hold said electronic device in portrait or landscape mode.

7. The handle of claim 6 further comprising:
a point connected to said pivot joint that locks into a notch when said handle is in portrait mode to prevent said pivot joint from rotating.

8. The handle of claim 1 further comprising:
standardized contact patches on said handle that mate with one or more clips to allow said electronic device to be mounted on a fixed surface such as a dashboard of a vehicle.

9. The handle of claim 1 further comprising:
detents in said hinge that hold said handle in either said stored position or said substantially perpendicular position.

10. A method of providing a handle for an electronic device comprising:
providing a ring to slide over a finger of a user of said electronic device;
attaching a hinge to said ring and to an exterior face of said electronic device, so that said ring can pivot on said hinge to a substantially perpendicular position to said exterior face to aid said user in holding said electronic device;
a recess in said exterior face of said electronic device such that said ring can fold into said recess and be positioned flush with said exterior face in a stored position when said handle is not in use; and,
placing a spring in said hinge that rotates said handle into said substantially perpendicular position when a button is pushed to release said handle from said stored position, where said button is located inside said ring when said handle is in said stored position so that said ring automatically slides over said finger of said user when said finger pushes said button.

11. The method of claim 10 where said exterior face of said electronic device is an integral part of said electronic device.

12. The method of claim 10 where said exterior face of said electronic device is a protective case placed around said electronic device.

13. The method of claim 10 further comprising:
connecting two branches to opposite ends of said ring such that additional fingers of said user utilize said branches to further stabilize said electronic device when using said handle.

14. The method of claim 10 further comprising:
placing a pivot joint between said hinge and said exterior face of said electronic device so that said handle can pivot ninety degrees to enable said user to hold said electronic device with said handle in portrait or landscape mode.

15. The method of claim 14 further comprising:
providing a sliding track between said hinge and said exterior face of said electronic device so that said handle can be located at different positions on said exterior face of said electronic device that are optimized for said user to hold said electronic device in portrait or landscape mode.

16. The method of claim 15 further comprising:
connecting a point to said pivot joint that locks into a notch when said handle is in portrait mode to prevent said pivot joint from rotating.

17. The method of claim 10 further comprising:
placing standardized contact patches on said handle that mate with one or more clips to allow said electronic device to be mounted on a fixed surface such as a dashboard of a vehicle.

18. The method of claim 10 further comprising:
placing detents in said hinge that hold said handle in either said stored position or said substantially perpendicular position.

* * * * *